US006552299B2

United States Patent
Bauer et al.

(10) Patent No.: US 6,552,299 B2
(45) Date of Patent: Apr. 22, 2003

(54) LASER-PROCESSING UNIT WITH OBSERVATION DEVICE

(75) Inventors: Wolfgang Bauer, Gemering (DE); Lutz Langhans, Starnberg (DE); Thomas Renner, München (DE)

(73) Assignee: Carl Baasel Lasertechnik GmbH, Starnberg (DE)

( * ) Notice: Subject to any disclaimer, the term of this patent is extended or adjusted under 35 U.S.C. 154(b) by 0 days.

(21) Appl. No.: 09/992,340

(22) Filed: Nov. 19, 2001

(65) Prior Publication Data

US 2002/0066721 A1 Jun. 6, 2002

(30) Foreign Application Priority Data

Nov. 17, 2000 (DE) ......................................... 100 57 298

(51) Int. Cl.[7] .............................................. B23K 26/20
(52) U.S. Cl. .............................. 219/121.63; 219/121.74
(58) Field of Search ........................ 219/121.6, 121.63, 219/121.64, 121.65, 121.66, 121.72, 121.74, 121.83, 121.85

(56) References Cited

U.S. PATENT DOCUMENTS

| 4,396,285 A | 8/1983 | Presta et al. |
| 5,449,882 A | 9/1995 | Black et al. |
| 5,578,227 A | * 11/1996 | Rabinovich |
| 5,841,097 A | * 11/1998 | Esaka et al. |
| 5,850,068 A | * 12/1998 | Peters et al. |

FOREIGN PATENT DOCUMENTS

| DE | 38 07 471 A1 | 10/1988 |
| DE | 38 05 053 A1 | 8/1989 |
| DE | 44 26 384 C1 | 8/1995 |
| DE | 198 28 723 A1 | 1/2000 |

* cited by examiner

*Primary Examiner*—Samuel M. Heinrich
(74) *Attorney, Agent, or Firm*—Laurence A. Greenberg; Werner H. Stemer; Gregory L. Mayback

(57) ABSTRACT

The invention relates to a laser-processing unit, in particular a laser-welding unit, having a laser beam source (2) for generating a laser beam (LS) and having a pivotable focusing unit (8) for pivoting the laser beam (LS) about two axes of rotation (x, y) and for focusing the laser beam (LS) in a focus (F). A dichroic mirror (4) is arranged in the beam path of the laser beam (LS) between the laser beam source (2) and the focusing unit (8), which mirror is assigned an observation device (20) in such a manner that the optical axis (22) of this device coincides with the axis (24) of the laser beam (LS) as it propagates downstream of the dichroic mirror, as seen in the direction of propagation of the laser beam (LS).

5 Claims, 1 Drawing Sheet

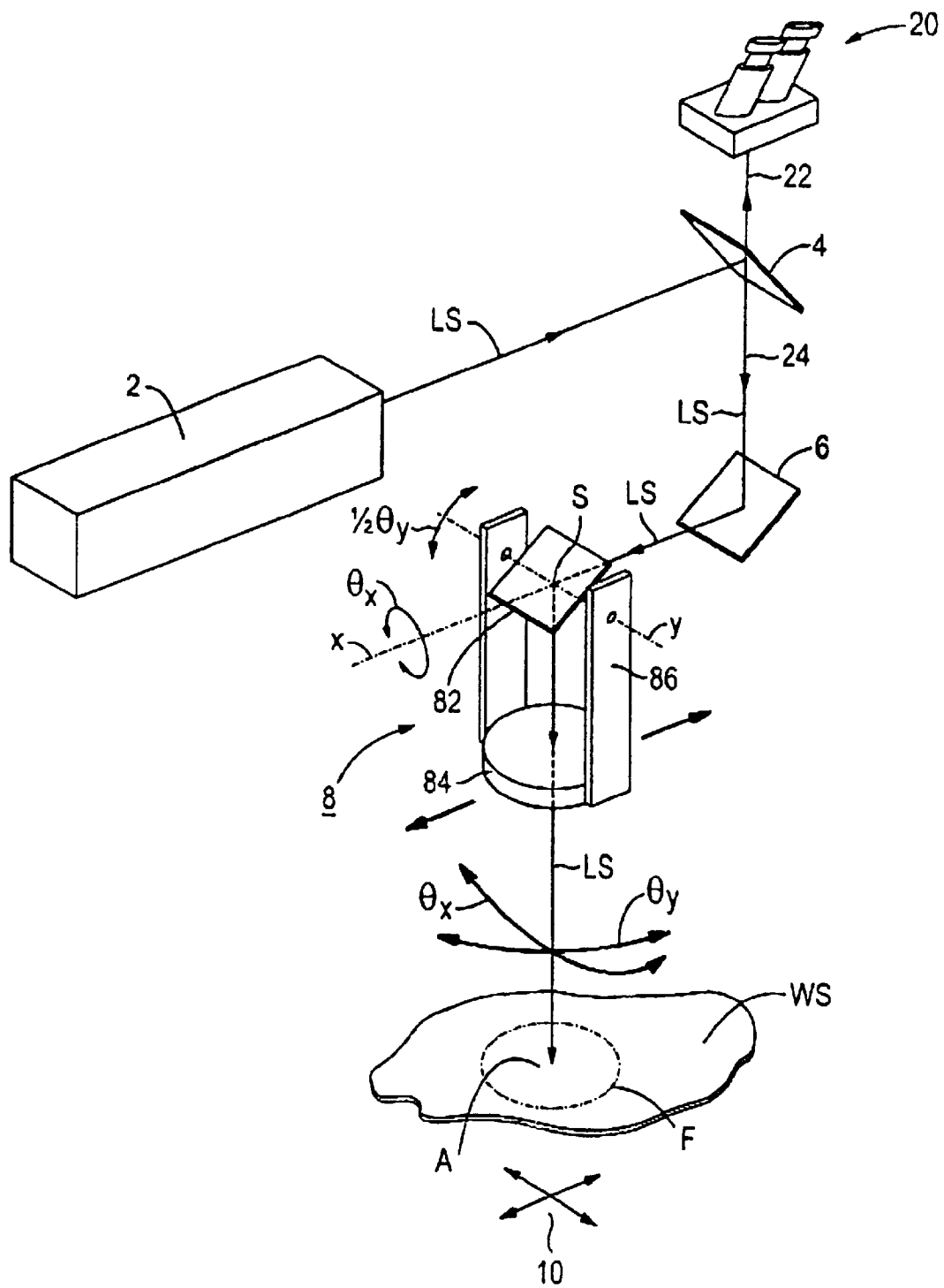

LASER-PROCESSING UNIT WITH OBSERVATION DEVICE

BACKGROUND OF THE INVENTION

Field of the Invention

The invention relates to a laser-processing unit, in particular a laser-welding unit, having an observation device for observing the working point.

When processing a workpiece using a laser beam, it is necessary for the working point on the workpiece to be arranged correctly in the focus of the laser beam which is focused by a focusing unit. Particularly during manual precision processing of a workpiece using a manual welding laser unit, for example when finishing injection moldings by build-up welding, an observation microscope is used to correctly set the focus and the point of impingement of the laser beam on the workpiece. The correct positioning of the workpiece is carried out with the aid of a height-adjustable x-y bench. In order also to be able to process edges or to reach working points on workpiece surfaces which are oriented perpendicular to the x-y plane, it is also necessary for the propagation direction of the focused laser beam relative to the workpiece, i.e. the angle at which the laser beam impinges on the workpiece, to be adapted to the particular position of the working point, and consequently it may additionally be necessary for the workpiece to be tilted relative to the focusing unit.

Published-German Patent Application DE 38 07 471 A1 discloses an apparatus for guiding a laser beam in which the laser beam can be pivoted about two axes which are perpendicular to one another by means of a pivotable deflecting mirror. When processing workpieces that are not planar, e ability to pivot the laser beam about these two axis, allows one to correctly orient the angle at which the laser beam impinges on the workpiece. In this way, the propagation direction of the laser beam can be oriented in the appropriate working point perpendicular to the surface of the workpiece without having to pivot the entire workpiece. However, the known apparatus does not provide an optical aid for monitoring the correct positioning of the laser beam on the workpiece.

A laser-processing unit having an observation microscope is known, for example, from U.S. Pat. No. 5,449,882. In this laser-processing unit, a stationary observation microscope, which allows the workpiece to be observed in the working area of the laser beam, is arranged behind a dichroic mirror. In the known apparatus, the use of a stationary microscope is sufficient, since this apparatus only allows linear displacement of the laser beam within a relatively small working area, and consequently, the focus of the laser beam does not leave the fixed field of view of the observation microscope. Moreover, the position of the focus of the laser beam can only be seen when the beam-impinges on he workpiece, so that the focal position can only be corrected after processing has commenced.

SUMMARY OF THE INVENTION

The invention is based on the object of providing a laser-processing unit, in particular a laser-welding unit, which, while having a compact structure and a relatively large working area which can be covered by the laser beam, allows exact positioning and orientation of the laser beam onto the workpiece even before processing commences.

According to the invention, said object is achieved by a laser-processing unit having the features of patent claim 1.

Since a pivotable focusing unit is provided, tilting or pivoting of the workpiece is no longer required in a wide range of applications. Rather, the laser beam is oriented by pivoting the focusing unit which, on account of the low mass which has to be moved, can be positioned more accurately and with less mechanical difficulty. Moreover, the use of a pivotable focusing unit allows a large deflection angle to be achieved with a small focusing lens or a small focusing mirror.

Since, moreover, a dichroic mirror is arranged in the beam path of the laser beam between the laser beam source and the focusing unit, which mirror is assigned an observation device in such a manner that the optical axis of this device coincides with the axis of the laser beam as it propagates downstream of or behind the dichroic mirror, as seen in the propagation direction of the laser beam, correct and accurate positioning of the workpiece in the working point and orientation of the laser beam are possible. The folding or superimposing of the laser beam path and of the observation device ensure that the focus of the laser beam, i.e. the correct working point, is always in the center of the field of view of the observation device, for example congruent with faded-in cross hairs, even when the orientation of the laser beam is changed. In other words, the center of the field of view inevitably and automatically reproduces the impingement point of the laser beam on the workpiece. The correct position of the workpiece is reached when the selected working point on the workpiece surface has been set centrally and in-focus in the observation device. Therefore, the position of the focus can be set exactly at the desired working point even before processing has commenced, i.e. before the laser beam source is switched on.

The arrangement of the dichroic mirror upstream of the pivotable focusing unit, i.e. in the section of the beam path of the laser beam from the laser beam source to the focusing unit, which is in a spatially fixed position inside the laser-processing unit, allows the pivotable laser beam to be observed using an observation device which is likewise fixed, it being possible for the working area of the laser beam which can be covered by the pivoting movement to be larger than the field of view of the observation device. Since the field of view of the observation device automatically and inevitably follows the pivoting movement of the laser beam, it is possible to operate with relatively high magnifications, depending on the particular application.

Further advantageous configurations of the invention will emerge from the subclaims.

BRIEF DESCRIPTION OF THE DRAWINGS

The sole drawing FIGURE is a diagrammatic view of laser processing unit.

For further explanation of the invention, reference is made to the exemplary embodiment shown in the drawing, the only FIGURE of which shows a laser-processing unit according to the invention in a diagrammatic, perspective illustration. According to the FIGURE, the laser-processing unit comprises a laser beam source 2, for example an Nd:YAG solid-state laser, which generates a laser beam LS. A dichroic (wavelength-selective) mirror 4 is arranged in the beam path of the laser beam LS and reflects the laser beam LS, so that it is diverted, via a further deflecting mirror 6, to a pivotable focusing unit 8, which focuses the laser beam LS. The beam path of the laser beam LS between the focusing unit 8 and the laser beam source 2 is spatially fixed within the laser-processing unit.

In the exemplary embodiment, the pivotable focusing unit 8 includes a deflecting mirror 82 and optically downstream focusing optics 84, in the exemplary embodiment a lens, which is used to focus the laser beam LS on a workpiece WS. In order to be correctly positioned in a starting position which is required for the laser processing, and for the purpose of relative movement between laser beam LS and workpiece WS during processing, the workpiece WS is arranged on a vertically adjustable X-Y table, which is only diagrammatically indicated in the FIGURE by crossing axes 10.

The pivotable focusing unit 8 is mounted by means of a universal joint and can be pivoted about two axes of rotation, in the exemplary embodiment, about two axes of rotation x, y which are orthogonal to one another, so that the focused laser beam LS can be pivoted through the rotation angles $\theta_x$, $\theta_y$. One of the axes of rotation x, y, in the exemplary embodiment, the axis of rotation x, coincides with the axis of the laser beam LS as it propagates from the deflecting mirror 6 to the focusing unit 8. The axis of rotation y runs perpendicular thereto. The axes of rotation x, y intersect one another in a common intersection point S, which at the same time is also the point of impingement of the laser beam LS on the deflecting mirror 82.

A pivoting movement of the focusing unit 8 leads to a pivoting movement of the laser beam LS in the processing plane through the angles $\theta_x$, $\theta_y$. To enable the laser beam LS to follow the pivoting movement of the focusing unit 8 about the axis of rotation y, it is necessary for the deflecting mirror 82 to be tilted accordingly through the angle $\theta_y/2$. Therefore, the deflecting mirror 82 has to be tilted about the axis of rotation y through an angle which is half as great as the pivoting angle $\theta_y$ of the focusing unit 8. Therefore, within the focusing unit 8, the deflecting mirror 82 is mounted so that it can rotate about the axis of rotation y relative to the focusing unit 8 and therefore relative to the focusing optics 84 which are in a fixed position inside the focusing unit 8. This is indicated in the FIGURE by the diagrammatically depicted pivot bearing 86.

A stationary binocular observation microscope 20 is arranged behind the dichroic mirror 4, in such a manner that its optical axis 22 coincides with the optical axis 24 of the laser beam LS which is deflected by the dichroic mirror 4, i.e. of the laser beam LS which propagates downstream of or behind the dichroic mirror 4, as seen in the propagation direction of the laser beam LS. The optical axis is stationary inside the laser-processing unit. In the exemplary embodiment, the dichroic mirror 4 is designed in such a manner that it reflects light in the wavelength region of the laser beam LS, in the example 1064 nm, and transmits light in the visible wavelength region, so that the binocular observation microscope 20 can be used to observe the workpiece WS in the region of the focus or working point A of the laser beam LS. Since the beam path of the laser beam LS coincides with the beam path of the observation microscope 20, it is ensured that, in the event of a pivoting movement of the focusing unit 8 including the deflecting mirror 82 and the focusing optics 84, the center of the field of view F of the observation microscope 20, which is preferably marked by faded-in cross hairs, and the focus range (object plane which is shown in-focus) always coincide with the working point A. In other words, the working point A is positioned correctly in the focus of the laser beam LS when it is set in-focus in the center of the field of view F of the observation microscope 20.

The pivoting of the focusing unit 8 about the axes of rotation x, y takes place manually, in order to allow individual setting of the impingement angle and impingement point of the laser beam LS on the workpiece WS. A drive mechanism which is coupled to the focusing unit 8 enables the deflecting mirror 82 to automatically follow the pivoting movement of the focusing unit 8 through the appropriate angle $\theta_x$, $\theta_y/2$. In principle, however, it is also possible to use motor drives for pivoting the focusing unit and to effect automated control when processing batches, i.e. a large number of identical workpieces WS. In this case, the observation microscope 20 is used only for process control.

As an alternative to the dichroic mirror which is illustrated in the FIGURE and is transparent to light in the visible wavelength region, it is in principle also possible to use a dichroic mirror which transmits the laser light and reflects light in the visible wavelength region.

It is also possible for a fixed video camera, allowing remote operation of the pivoting optics, to be provided instead of a fixed binocular observation microscope.

We claim:

1. A laser-processing unit, comprising:

a laser beam source for generating a laser beam;

a pivotable focusing unit for pivoting the laser beam about two axes of rotation and for focusing the laser beam in a focus;

a dichroic mirror configured in a beam path of the laser beam between said laser beam source and said focusing unit; and an observation device associated with said dichroic mirror;

the laser beam propagating downstream of said dichroic mirror along a propagation axis;

said observation device having an optical axis coinciding with the propagation axis of the laser beam downstream of the dichroic mirror.

2. The laser-processing device according to claim 1, comprising a universal joint mounting said focusing unit.

3. The laser-processing device according to claim 2, wherein said pivotable focusing unit includes a deflecting mirror that is tiltably mounted about two axes of rotation that are orthogonal to one another.

4. The laser-processing device according to claim 1, wherein said pivotable focusing unit includes a deflecting mirror that is tiltably mounted about two axes of rotation that are orthogonal to one another.

5. A laser-welding unit, comprising:

a laser beam source for generating a laser beam;

a pivotable focusing unit for pivoting the laser beam about two axes of rotation and for focusing the laser beam in a focus;

a dichroic mirror configured in a beam path of the laser beam between said laser beam source and said focusing unit; and an observation device associated with said dichroic mirror;

the laser beam propagating downstream of said dichroic mirror along a propagation axis;

said observation device having an optical axis coinciding with the propagation axis of the laser beam downstream of the dichroic mirror.

* * * * *